United States Patent
Yung

(10) Patent No.: US 9,092,992 B2
(45) Date of Patent: Jul. 28, 2015

(54) SYSTEM AND METHOD FOR MUSIC EDUCATION

(75) Inventor: Chi Wai Yung, Hong Kong (HK)

(73) Assignee: PLAYNOTE LIMITED, Hong Kong (HK)

( * ) Notice: Subject to any disclaimer, the term of this patent is extended or adjusted under 35 U.S.C. 154(b) by 0 days.

(21) Appl. No.: 14/232,618

(22) PCT Filed: Jul. 13, 2012

(86) PCT No.: PCT/CN2012/078648
§ 371 (c)(1),
(2), (4) Date: Jan. 14, 2014

(87) PCT Pub. No.: WO2013/007218
PCT Pub. Date: Jan. 17, 2013

(65) Prior Publication Data
US 2014/0123833 A1    May 8, 2014

Related U.S. Application Data

(60) Provisional application No. 61/507,608, filed on Jul. 14, 2011.

(51) Int. Cl.
*G10H 1/00*       (2006.01)
*G10H 1/18*       (2006.01)
*G10H 7/00*       (2006.01)
*G09B 15/00*      (2006.01)

(52) U.S. Cl.
CPC ..................... *G09B 15/00* (2013.01)

(58) Field of Classification Search
CPC .............................................. G10H 2210/091
USPC ................................ 84/470 R, 611, 615, 609
See application file for complete search history.

(56) References Cited

U.S. PATENT DOCUMENTS

| | | | | |
|---|---|---|---|---|
| 5,567,162 | A * | 10/1996 | Park | 434/307 A |
| 6,751,439 | B2 * | 6/2004 | Tice et al. | 434/350 |
| 7,164,076 | B2 * | 1/2007 | McHale et al. | 84/616 |
| 7,199,298 | B2 * | 4/2007 | Funaki | 84/477 R |
| 7,538,266 | B2 * | 5/2009 | Takehisa | 84/609 |
| 8,148,621 | B2 * | 4/2012 | Bright et al. | 84/609 |
| 8,629,342 | B2 * | 1/2014 | Lee et al. | 84/610 |

(Continued)

FOREIGN PATENT DOCUMENTS

CN     101853650 A     10/2010

OTHER PUBLICATIONS

International Search Report of PCT Application No. PCT/CN2012/078648.

*Primary Examiner* — Jeffrey Donels

(57) ABSTRACT

A system for music education includes a storage device being configured to store a set of record data; a recording device being configured to record a musical exercise; a processor being connected to the storage device and the recording device, and configured to determine the start and the end of the musical exercise by the detected volume of the musical exercise, to convert the recording of the musical exercise to a set of user data, to retrieve the set of record data and to map the set of user data to the set of record data, to analyze differences between the two based on the mapping and to calculate a series of values and to calculate a score as the sum of the series of values multiplied by a series of coefficients respectively; and an electronic display being connected to the processor. A method for music education is also provided.

18 Claims, 11 Drawing Sheets

(56) References Cited

U.S. PATENT DOCUMENTS

| | | | |
|---|---|---|---|
| 2001/0004861 A1* | 6/2001 | Suzuki et al. | 84/609 |
| 2001/0039870 A1* | 11/2001 | Shimaya et al. | 84/478 |
| 2003/0167903 A1* | 9/2003 | Funaki | 84/477 R |
| 2004/0055441 A1* | 3/2004 | Katsuta | 84/470 R |
| 2004/0123726 A1* | 7/2004 | Kato et al. | 84/609 |
| 2008/0078281 A1* | 4/2008 | Katsuta | 84/609 |
| 2009/0148135 A1* | 6/2009 | Ishino et al. | 386/124 |
| 2010/0004928 A1 | 1/2010 | Yonekubo et al. | |
| 2013/0074679 A1* | 3/2013 | Minamitaka | 84/609 |
| 2013/0081531 A1* | 4/2013 | Minamitaka | 84/477 R |

* cited by examiner

SYSTEM AND METHOD FOR MUSIC EDUCATION

CROSS-REFERENCE TO RELATED APPLICATIONS

This application claims the benefit of U.S. Provisional Application No. 61/507,608, filed on Jul. 14, 2011; the contents of which is hereby incorporated by reference.

FIELD OF THE PATENT APPLICATION

The present patent application generally relates to computer assisted music education and more specifically to a system and a method for music education.

BACKGROUND

One of the most important trainings in music education is to improve musicianship of students. Musicianship includes the capabilities of singing and playing music instrument with correct frequencies and timing, counting beat correctly and finding characters of music by hearing. These are also one of the major subjects in music examinations provided by international music institutes, such as Associate Board of Royal School Music (ABRSM) in UK, Royal Conservatory of Music Examinations (RCM) in Canada, Australian Music Examinations Board (AMEB) in Australia and etc.

Previously, all these trainings can only be provided by teachers within a room. While there are some other materials, e.g. recorded waves in CD or online to train students in finding characters of music by hearing, there is no way for students to learn singing, playing a music instrument, and counting beats without the teacher as the performance must be judged by the teacher and the teacher will give feedback after listening to the student's performance. Even though students can record the performance and send the recording to the teacher though a network, it still requires a teacher to judge.

On the other hand, in any teaching with a teacher, the teacher can only tell what the good points and bad points about a student's performance are by mouth. The teacher can record the performance and replay it. However, it is very inconvenient for the teacher to record the performance every time. Even when there is a recording, the student needs to imagine which part of the performance is good or bad based on teacher's words, without any visual aids to help.

In addition, since the performance of the students can vary in many directions, the teacher cannot record the performance in a scientific way. In other words, the teacher can only mark some major errors but it is difficult for the teacher to have a whole picture on the progress of the students' performance.

SUMMARY

The present patent application is directed to a system and a method for music education. In one aspect, the system includes a storage device being configured to store a set of record data that contains information about speed, timing, frequency and beats of a standard musical sample; a recording device being configured to record a musical exercise; a processor being connected to the storage device and the recording device, and configured to determine the start and the end of the musical exercise by the detected volume of the musical exercise, to convert the recording of the musical exercise to a set of user data, to retrieve the set of record data from the storage device and to map the set of user data to the set of record data, to analyze differences between the user data and the record data based on the mapping and thereby to calculate a series of values related to speed, timing, frequency or power of the user data, and to calculate a score as the sum of the series of values multiplied by a series of coefficients respectively; and an electronic display being connected to the processor and configured to display the series of values, the score, or the differences between the user data and the record data to a user.

In another aspect, the present patent application provides a computer-implemented method for music education. The method includes storing a set of record data that contains information about speed, timing, frequency and beats of a standard musical sample on a storage device; recording a musical exercise with a recording device while determining the start and the end of the musical exercise by the detected volume of the musical exercise with a processor; converting the recording of the musical exercise to a set of user data with the processor; retrieving the set of record data from the storage device and mapping the set of user data to the set of record data with the processor; analyzing differences between the user data and the record data based on the mapping and thereby calculating a series of values related to speed, timing, frequency or power of the user data with the processor; calculating a score as the sum of the series of values multiplied by a series of coefficients respectively with the processor; and displaying the score and the differences between the user data and the record data to a user through an electronic display.

Recording the musical exercise may include starting recording by the processor when the detected volume of the musical exercise has been higher than a predetermined threshold for a predetermined number of times, and ending recording by the processor when the detected volume of the musical exercise has been lower than a predetermined threshold for a predetermined number of times.

The musical exercise may include a sequence of clapping, and converting the recording of the musical exercise to the set of user data may include calculating the sum of the peak power of the clapping multiplied by a first coefficient and the total power of the clapping multiplied by a second coefficient, and thereby detecting the sequence of clapping from the set of user data and eliminating noise from the result of the detection by the processor.

The method may further include calculating the duration of each clap in the adjusted user data and in the record data respectively, and determining whether the difference therebetween is within a predetermined tolerance by the processor.

The musical exercise may include singing or music instrument playing, and the method may further include filtering out any music note that is in a predetermined frequency in the user data and adjusting the scale of the user data according to the scale of the record data before the mapping by the processor.

The method may further include transforming the record data and the user data into a matrix, calculating a cost of error for each node of the matrix, and adjusting the speed and the key signature of the record data by finding a path with the lowest accumulative cost of error based on different combination of speeds and key signatures by the processor.

In yet another aspect, the present patent application provides a computer-implemented method for music education. The method includes storing a set of record data that contains information about speed, timing, frequency and beats of a standard musical sample on a storage device; recording a musical exercise with a recording device; converting the recording of the musical exercise to a set of user data with a processor; retrieving the set of record data from the storage device and mapping the set of user data to the set of record data with the processor; comparing the user data to the record data based on the mapping with the processor; and displaying the difference between the user data and the record data as well as a score representing a quantitative evaluation of the musical exercise based on the comparison to a user through an electronic display. Musical elements in the record data is displayed in a first type of color, musical elements in the user data with a strong power is displayed in a second type of color, and musical elements in the user data with a weak power is displayed in a third type of color.

BRIEF DESCRIPTIONS OF THE DRAWINGS

DETAILED DESCRIPTION

According to an embodiment of the present patent application, a system for music education includes a storage device, a recording device, a processor and an electronic display. The storage device is configured to store a set of record data that contains information about speed, timing, frequency and beats of a standard musical sample. The recording device is configured to record a musical exercise. The processor is connected to the storage device and the recording device, and configured to determine the start and the end of the musical exercise by the detected volume of the musical exercise, to convert the recording of the musical exercise to a set of user data, to retrieve the set of record data from the storage device and to map the set of user data to the set of record data, to analyze differences between the user data and the record data based on the mapping and thereby to calculate a series of values related to speed, timing, frequency or power of the user data, and to calculate a score representing a quantitative evaluation of the musical exercise based on the series of values. The electronic display is connected to the processor and configured to display the series of values, the score, or the differences between the user data and the record data to a user.

Figure 1:
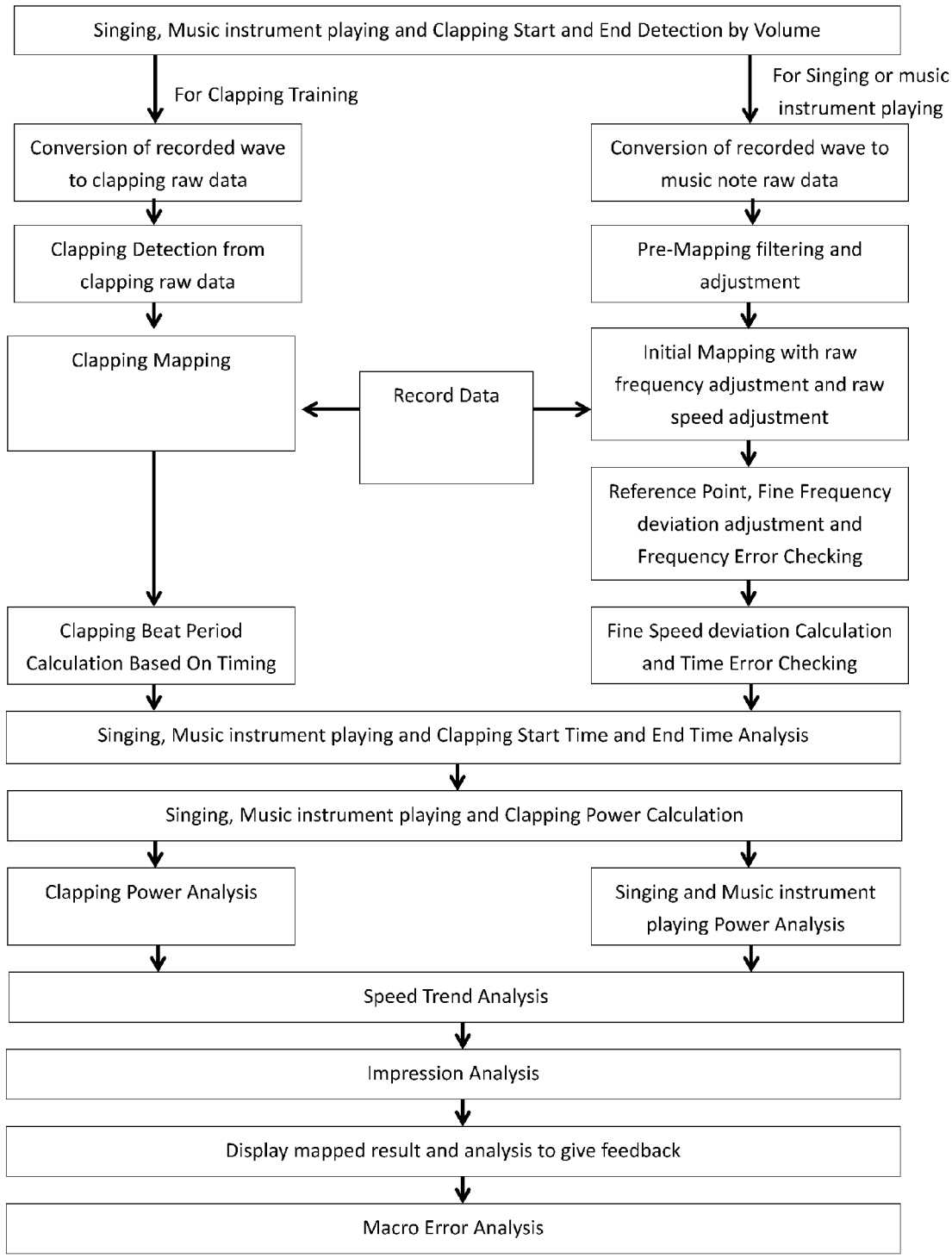
FIG. 1 is a flow chart illustrating the steps of a method for music education according to an embodiment of the present patent application.

FIG. 1 is a flow chart illustrating the steps of a method for music education according to an embodiment of the present patent application. The blocks in FIG. 1 are described in detail hereafter.

Record Data

The key of the examination and training is to compare the performance of student and the original music/beat. In this system, the original music/beat is stored. The time signature, key signature, speed, tonality, absolute frequencies and beats of all music notes are stored. Such information of the original music is stored on a server or a user's device in this embodiment and referred to as the Record Data hereafter. For analysis of the student's performance in singing or playing music instrument, the music notes and frequencies with the time stamp of the music are used as the source for comparison. For analysis of the student's performance in counting beat (by clapping, making any standardized noise or any means that can show the intention of the student's beat counting), the timestamp of the music note (for the analysis of the student's performance in counting beats of each music notes) or timestamp calculated by time signature with speed information (for the analysis of the student's performance in counting standard beat information of the whole song) are used as the source for comparison.

Singing, Music Instrument Playing and Clapping Start and End Detection by Volume In order to check whether the user has started and stopped singing, music instrument playing and clapping so that the system can response in an interactive way, the system has an algorithm to detect the start and stop of student's performance by volume.

Figure 2:
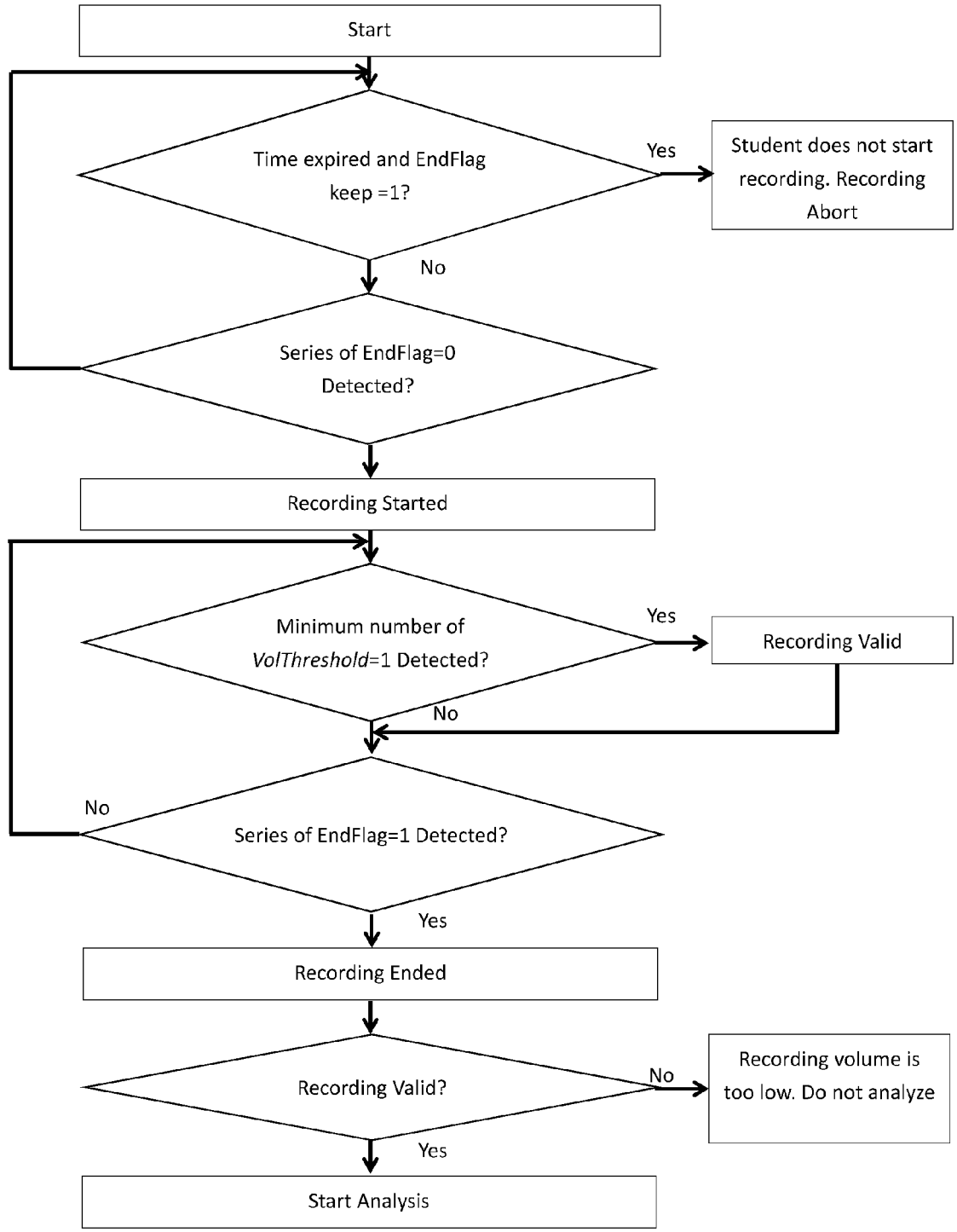
FIG. 2 is a flow chart illustrating the start and the end detection in the method illustrated in FIG. 1.

FIG. 2 is a flow chart illustrating the start and the end detection in the method illustrated in FIG. 1. Referring to FIG. 1 and FIG. 2, in the system, two parameters, VolThreshold and EndFlag, are being updated during the recording, in every preset period. VolThreshold will be changed to 1 when the recording volume reaches a threshold 1. The analysis system can analyze the recording to give a reasonable and correct result if the recording volume is higher than the threshold 1. EndFlag will be changed to 1 when the recording volume is lower than threshold 2. The threshold 2 must be lower than threshold 1.

Figure 3:
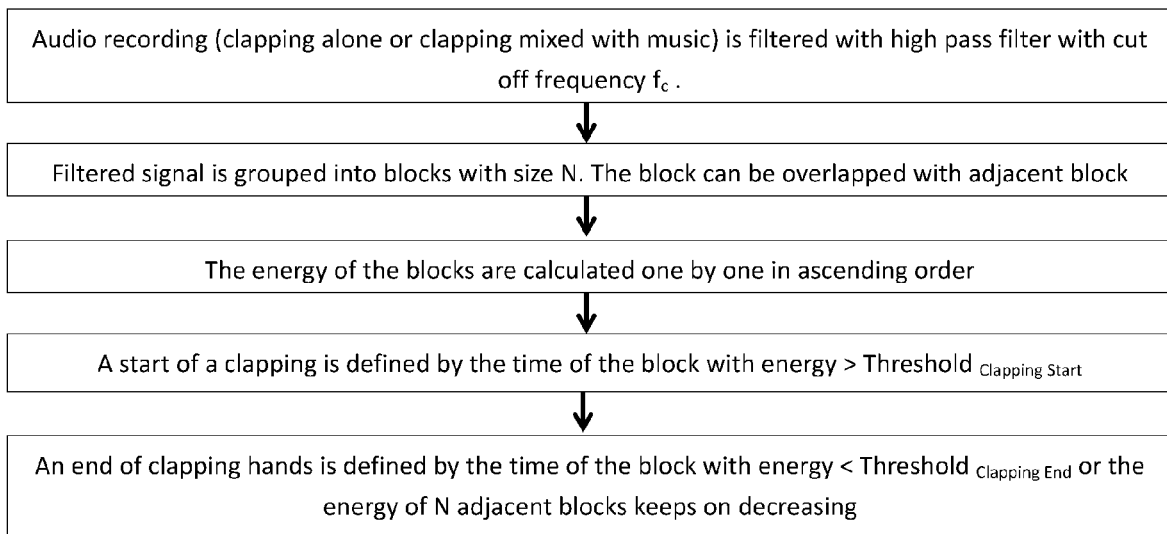
FIG. 3 is a flow chart of conversion of recorded wave to clapping raw data in the method illustrated in FIG. 1.

During the recording, if the system can detect a predetermined continuous number of EndFlag=0, the system will consider the student's performance has been started. The recording will be started, no matter whether this signal is detected. If the system cannot detect a minimum number of EndFlag=0 within a preset period, the system will consider student cannot start the performance and show warning and the recording will be ended. After system considers the performance has been started, if the system can detect another predetermined continuous number of EndFlag=1, the system will consider student's performance as having ended. During the recording, if there is any moment in which the system can detect a minimum number of VolThreshold=1, the system will consider the recording is valid. Otherwise, after the recording, the system will prompt that the recording is not valid due to low volume of the student's performance Conversion of Recorded Wave to Clapping Raw Data FIG. 3 is a flow chart of conversion of recorded wave to clapping raw data in the method illustrated in FIG. 1. There are 2 types of clapping training. The first type is clapping alone without any music background and the second type is clapping when music is being played. In the second type, the clapping sound is mixed with the music in audio recording.

The conversion can handle both types of clapping training. The algorithm is described hereafter.

Clapping Detection from Clapping Raw Data

A list of clapping with the timestamp, the total power of the clapping and the peak power of the clapping are provided by the front end engine. However, noises are also included in the output. The system will use the following algorithm to eliminate the noise.

Clapping will be considered as real clapping if $\alpha_{range(x)} \times$Peak Power$+\beta_{range(x)} \times$Total Power$>$Threshold Clapping$_{range(x)}$ The clapping will be remained in the list, for further analysis.

Clapping will be considered as unclear clapping if $\alpha_{range(x)} \times$Peak Power$+\beta_{range(x)} \times$Total Power$<$Threshold Unclear$_{range(x)}$ The clapping will be remained in the list with a marking indicating it is unclear, for further analysis.

Clapping will be considered as noise if $\alpha_{range(x)} \times$Peak Power$+\beta_{range(x)} \times$Total Power$<$Threshold Unclear$_{range(x)}$ The clapping will be eliminated from the list, wherein, x is the range that the current Peak Power belongs to.

Clapping Mapping

Figure 4:
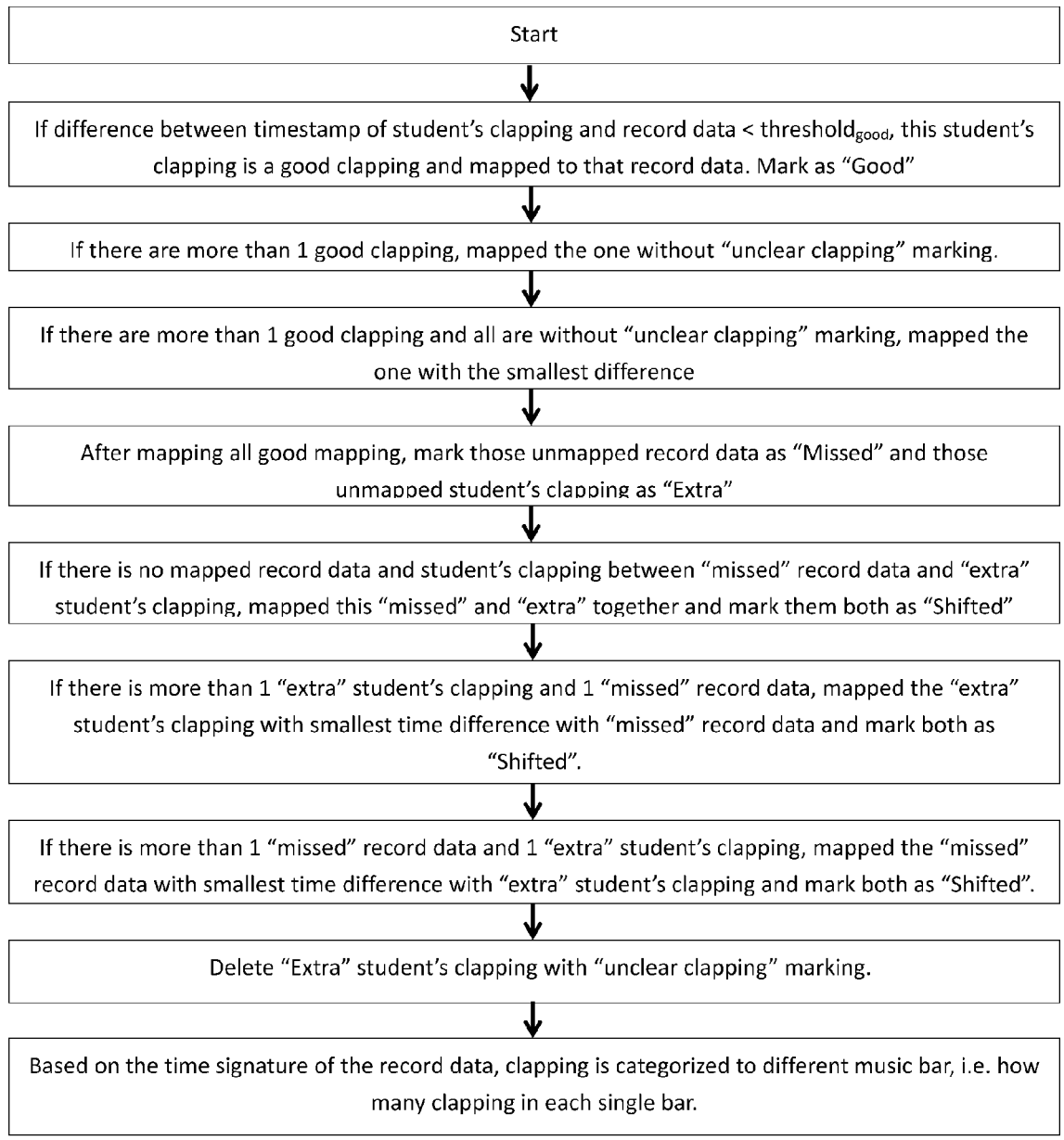
FIG. 4 is a flow chart of Clapping Mapping in the method illustrated in FIG. 1.

FIG. 4 is a flow chart of Clapping Mapping in the method illustrated in FIG. 1. The list of clapping after noise elimination will be used to compare with the record data, no matter what the beat of each note or the standard beat information of the whole song is.

After executing this algorithm, the system will know which clapping is correct, which clapping is extra clapping, which clapping is missed, and which clapping is shifted in timing.

Clapping Beat Period Calculation Based on Timing

Referring to the block "Clapping Beat Period Calculation Based On Timing", the timing of each clapping is checked. Based on the speed information in the record data, the duration of each clap in the record data can be calculated. This duration is compared to the duration of each clapping.

The duration of each clap: Duration$_{Clapping(N)}$=Timestamp$_{Clapping(N)}$−Timestamp$_{Clapping(N+1)}$ If the clapping duration is within the tolerance, i.e.

Duration$_{Clapping(N)}$−Allowance$_1>$
Duration$_{Clapping(N)}>$Duration$_{Clapping(N)}+$Allowance$_2$ The clapping will be considered as having correct beat period.

If the percentage of clapping having correct beat period>threshold beat period, the whole song will be marked as good beat period; if not, the whole song will be marked as bad beat period.

Conversion of Recorded Wave to Music Note Raw Data

Figure 5:
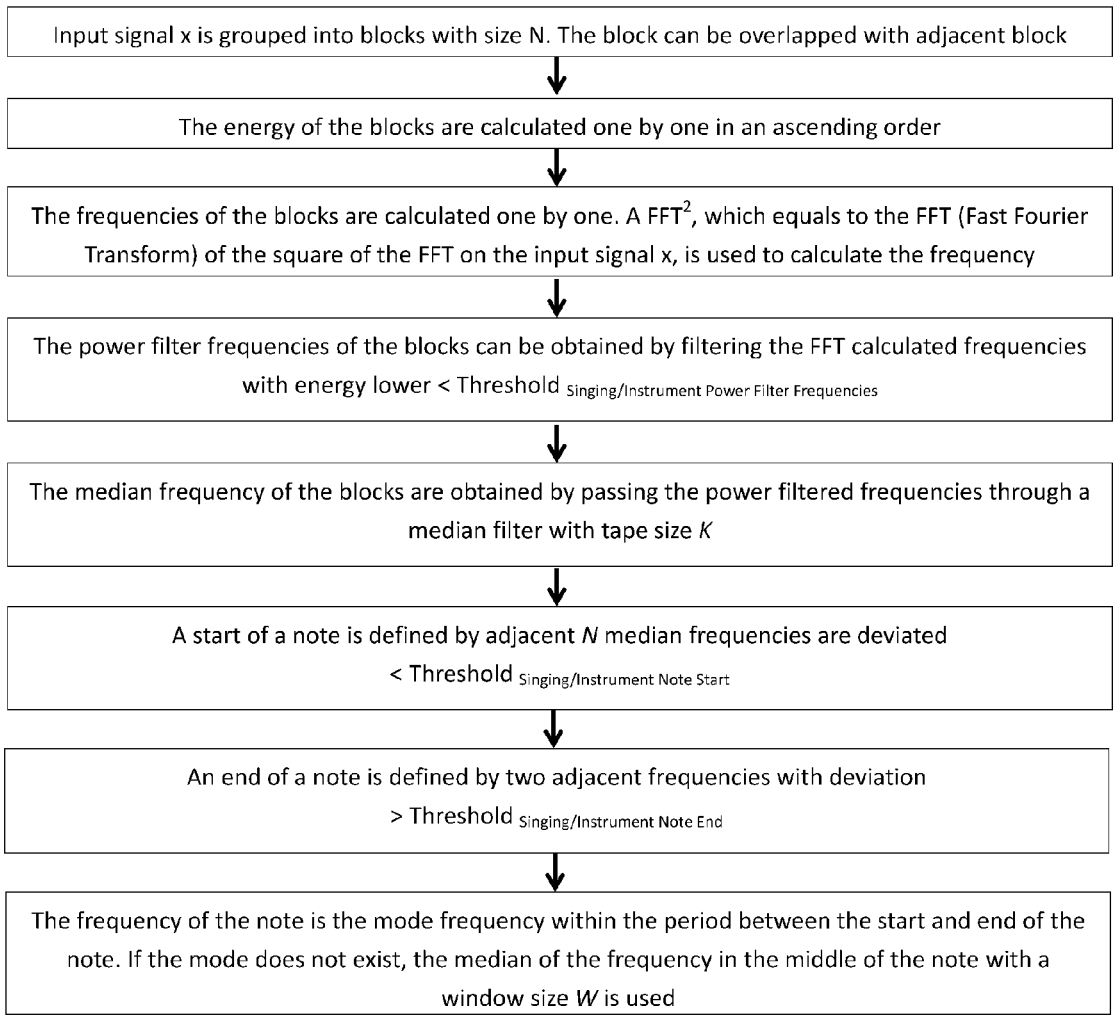
FIG. 5 is a flow chart of conversion of recorded wave to music note raw data in the method illustrated in FIG. 1.

FIG. 5 is a flow chart of conversion of recorded wave to music note raw data in the method illustrated in FIG. 1. This conversion is used in the singing or musical instrument playing training.

Pre-Mapping Filtering and Adjustment

Figure 6:
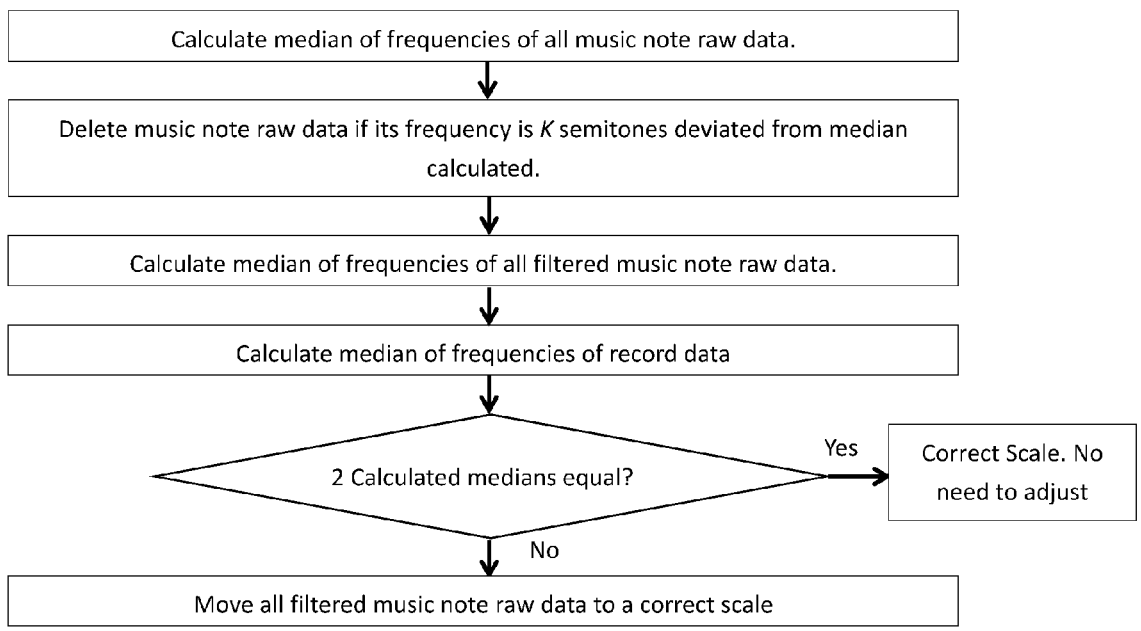
FIG. 6 is a flow chart of pre-mapping filtering and adjustment in the method illustrated in FIG. 1.

FIG. 6 is a flow chart of pre-mapping filtering and adjustment in the method illustrated in FIG. 1. The filtering and adjustment is used in singing training. Abnormal music note raw data filtering is in this block. Unlike the music note range of a music instrument, a single person can only sing within a limited range. The purpose of this filtering is to eliminate abnormal music note which cannot be sung by human After that, the filtered data will be checked whether its scale is the same as the scale of the record data. This adjustment is called "global scale frequency adjustment."

Initial Mapping with Raw Frequency Adjustment and Raw Speed Adjustment

This mapping gives an initial linkage between the record data and the student's performance. It is a straight forward process if (1) the student's performance is perfect, (2) there is no noise during the recording, and (3) there is no error in the conversion of the recorded waves to the music note raw data. However, there must be errors among these 3 factors and this mapping will take these factors into consideration.

In the mapping algorithm, the following terms are used

Missed note=The note that the student should sing/play but does not sing/play during the recording Extra note=The student has sung/played a note which is not in the record data Short note=Duration of the note<Threshold$_{Short Note}$. The duration of this note is too short and it is difficult for a human to sing or play. Most probably it is noise during the recording and it is not eliminated in the conversion before the initial mapping.

The record data and the music raw data are put into a matrix. If there are M music raw data and N record data, then an M×N matrix will be formed. A cost of error will be calculated for each matrix node, based on the following formula.

$\alpha \times$Absolute(Record data$_{Frequency}$−Music Raw Data$_{Frequency}$)$+\beta \times$Absolute(Record data$_{Duration}$−Music Raw Data$_{Duration}$)$+\Omega \times$Short Note Penalty$+\mu \times$Missed Note Penalty$+\eta \times$Extra Note Penalty The frequency and duration mentioned above is absolute frequency and duration. Short Note penalty will be included if the duration of the Music Raw data<Threshold$_{Short Note}$. $\alpha$, $\beta$, $\Omega$, $\mu$ and $\eta$ are the weight of the different factors in the formula.

After calculating the cost of error of each matrix node, the algorithm will find the path from lowest left hand side of the matrix to the highest right hand side of the matrix, with the lowest accumulative cost of errors. Since student may start to sing/play not from the beginning of the music and may end at any point before the end of music, the path found can be started not from the node (0, 0) and ended not at the node (M, N). However, if in the case the path is not started from the node (0, 0) or not ended at the node (M, N), the related missed note penalty and the extra note penalty will be added to the accumulative cost of errors.

Since the speed and the key signature of the student's performance may be different from the record data, the algorithm will find the path with the lowest accumulative costs based on different combination of speed and key signature by adjusting the key signature and speed of the record data. The variation of the speed and the key signature can be raw, i.e. the interval between each test case can be raw as the main purpose of this part is to get the initial mapping information.

The path with the lowest accumulative costs will be marked as the initial mapping path.

The record data that cannot be mapped will be marked as "Missed Note".

The student's performance music note raw data, whose duration<$Threshold_{Short\ Note}$ and cannot be mapped, will be marked as "Short Note".

The student's performance music note raw data, whose duration>$Threshold_{Short\ Note}$ and cannot be mapped, and whose frequency is within N semitones of the frequency of the music note raw data mapped before it, will be marked as "Sliding Note".

The student's performance music note raw data, whose duration>$Threshold_{Short\ Note}$ and cannot be mapped, and whose frequency is higher or lower than the frequency of the music note raw data mapped before it by N semitones, will be marked as "Extra Note".

Reference Point, Fine Frequency Deviation Calculation and Frequency Error Checking Even student's performance music note raw data can be mapped to the record data. There may be frequency errors and time errors. Human will consider the music note sang/played as an error music note if the difference between the frequency of the previous music note and the frequency of current music note is deviated from the requirement. Even the absolute frequency of the music note is incorrect; human may still think the music note is correct. In this system, both the relative frequency error and the absolute frequency error are considered. For frequency errors, there are 4 types of errors.

Relative Slight=The difference between the frequency of the previous music note and the
Frequency Error frequency of the current music note is deviated from the requirement slightly, e.g. N semitones.

Relative Serious=The different between the frequency of the previous music note and the
Frequency Error frequency of the current music note is deviated from the requirement seriously, e.g. N+M semitones.

Absolute Slight=The absolute frequency of the current music note is deviated from the
Frequency Error requirement slightly, e.g. P semitones.

Absolute Serious=The absolute frequency of the current music note is deviated from the
Frequency Error requirement seriously, e.g. P+Q semitones.

Relative and absolute frequency errors can occur together or alone at the same music note.

Figure 7:
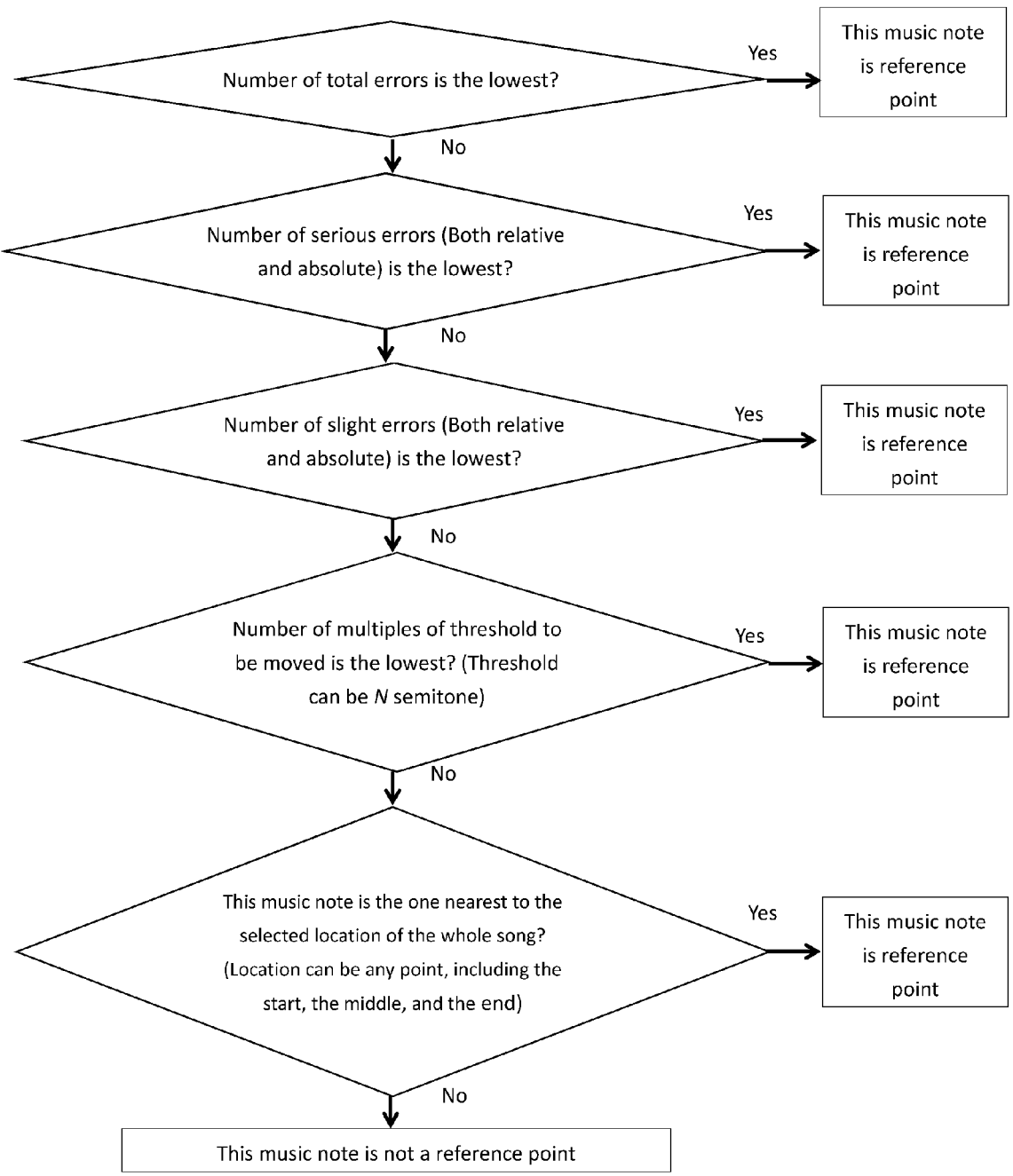
FIG. 7 is a flow chart for finding whether the music note is reference point in the method illustrated in FIG. 1.

In order to find out the fine frequency adjustment, a "reference point for frequency adjustment" is required. The frequency of the music note in the student's performance which is marked as a reference point will be considered as correct. The difference between the frequency of this music note in the student's performance and the frequency of the record data mapped will be treated as the fine frequency adjustment for all music notes in student's performance. Any one of the mapped music note in the student's performance can be the reference point based on the following rules. Referring to FIG. 7, each mapped music note can be determined on whether it is a reference point or not.

After the frequency reference point is found, the frequencies of all the music notes of the student's performance will be adjusted based on the difference between the frequency of the reference point music note of the student's performance and the frequency of the reference point record data.

After the adjustment, the 4 types of errors will be calculated and recorded.

The difference between the frequency of the reference point music note of the student's performance and the frequency of the reference point record data will also be recorded as "global key frequency adjustment".

Fine Speed Deviation Calculation and Time Error Checking

Similarly, there are 4 types of time errors.

Relative Slight=The difference between the timestamp of the previous music note and the
Time Error timestamp of the current music note is deviated from the requirement slightly, e.g. N beat.

Relative Serious=The difference between the timestamp of the previous music note and the
Time Error timestamp of the current music note is deviated from the requirement seriously e.g. N+M beat.

Absolute Slight=The absolute timestamp of the current music note is deviated from the
Time Error requirement slightly, e.g. P beat.

Absolute Serious=The absolute timestamp of the current music note is deviated from the
Time Error requirement seriously, e.g. P+Q beat.

Relative and serious time errors can occur together or alone at the same music note.

Figure 8:
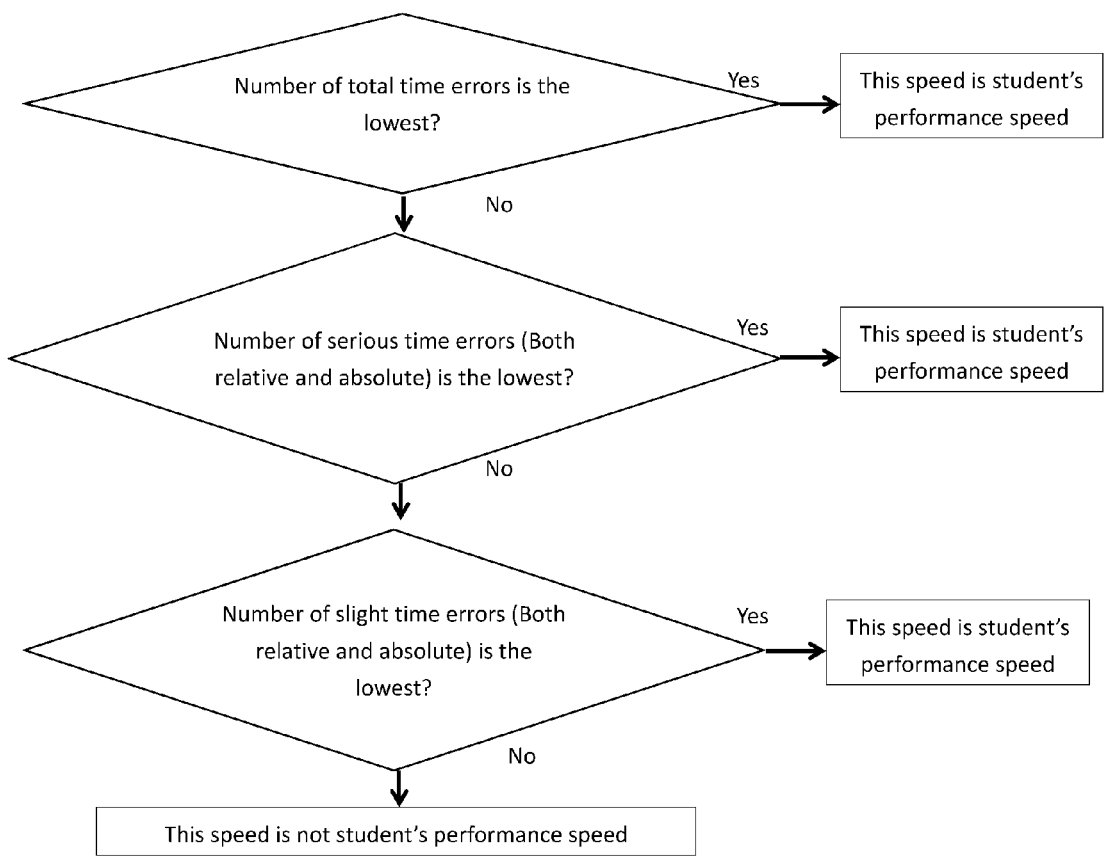
FIG. 8 is a flow chart of fine speed deviation calculation and time error checking in the method illustrated in FIG. 1.

Referring to FIG. 8, in order to find out the fine speed adjustment, different speeds will be tried until the one that best fits the illustrated algorithm is found.

After speed is found, the time stamp of each music note in record data will be re-calculated based on this speed. And then the record data with new speed will be compared to student's performance and the 4 types of time errors will be calculated and recorded.

The speed found will also be recorded as "student's performance speed".

Clapping, Singing/Instrument Playing Start Time and End Time Analysis

When the student starts clapping/singing/note playing and ends clapping/singing/note playing are critical factors to judge whether the clapping/singing/note playing is good or bad. In the system, the time stamp of the first "mapped", "shifted" or "extra" user's singing (for clapping training) and the "mapped" or "extra" student's singing/instrument playing, whichever timestamp is sooner (or the numerical time is lower), will be used to determine whether the start time is correct. Similarly, the timestamp of the first "mapped" "shifted" or "extra" user clapping, whichever timestamp is sooner, will be used to determine whether the start time is correct. Similarly, the timestamp of the last "mapped" shifted" or "extra" user clapping, whichever timestamp is later, will be used to determine whether the end time is correct. Similarly, the timestamp of the last "mapped", "shifted" or "extra" user singing/instrument playing, whichever timestamp is later, will be used to determine whether the end time is correct.

Singing, Music Instrument Playing and Clapping Power Calculation

Another critical factor to consider is whether the power of clapping or music note is correct. Student is required to clap/sing/play with a correct power to indicate "strong" or "weak" for each clapping. The power of the clapping/singing/note playing is considered as "strong" if $$\frac{\text{Clapping or Music Note Power } N \times \alpha}{\text{Moving Average}\left(\begin{array}{c}\text{Clapping or Music Note } N - \\ K \ldots \text{Clapping or Music Note } N + M\end{array}\right)} > $$

$$Threshold_{StrongBeat}$$

wherein α is the weight factor, K is the number of claps/music notes between current clapping/music note N and the first clapping/music note used in the calculation of moving average, M is the number of clapping/music note between current clapping/music note N and the last clapping/music note used in the calculation of moving average. The clapping/music note is considered as "weak" if it cannot fulfill the above formula.

Clapping Power Analysis

There are 2 analyses. (It is called "Macro Power Error").

Figure 9:
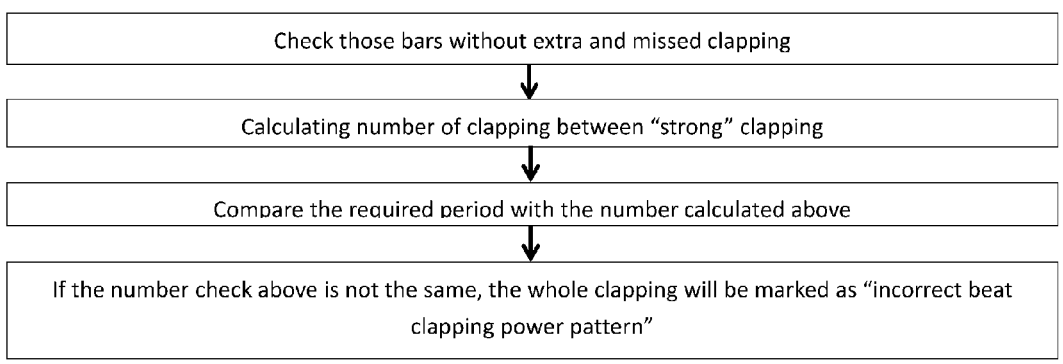
FIG. 9 is a first flow chart of Clapping Power Analysis in the method illustrated in FIG. 1.
Figure 10:
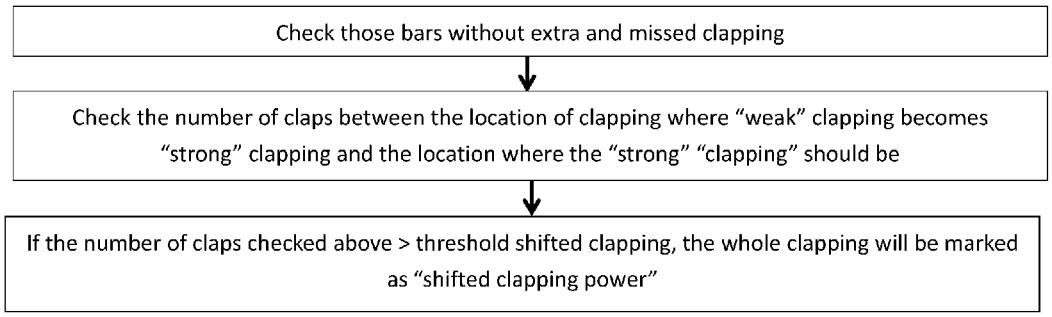
FIG. 10 is a second flow chart of Clapping Power Analysis in the method illustrated in FIG. 1.

1. Referring to FIG. 9, the first one is whether student has clapped in a correct pattern. For example, in a 3 beat time signature, the student is required to clap in a pattern "strong" "weak" "weak" periodically. If the student claps in any other pattern, it is considered as wrong.
2. Referring to FIG. 10, the second one is while student has clapped in a correct pattern, whether the "strong" beat is shifted in a number of periods.

If there is any clapping power error (i.e. a "strong power" clap is clapped as "weak power" or a "weak power" clap is clapped as "strong power") and there is no (1) incorrect beat clapping power pattern and (2) shifted clapping power, the clapping power error is considered as individual and just marked individually.

Singing and Music Instrument Playing Power Analysis

The power requirement of singing and music instrument playing is not in a periodical format. The power of each music note will be compared to the requirement of each note one by one.

Speed Trend Analysis

The last factor to be considered is while the timing of a series of clapping/music note is correct, whether there is a trend of the clapping/singing/music note playing time, either going faster or slower.

If the following formula can be satisfied, the clapping in that period will be considered as "clapping/singing/music note playing speed increasing".

$$(\text{Timestamp}_{User\ Clapping/Music\ Note(N)} - \text{Timestamp}_{Record\ data(N)}) < (\text{Timestamp}_{User\ Clapping/Music\ Note(N+1)} - \text{Timestamp}_{Record\ data(N1)}) < \ldots < (\text{Timestamp}_{User\ Clapping/Music\ Note(N+K)} - \text{Timestamp}_{Record\ data(N+K)}),$$ wherein $K$=the number of claps/music notes to be checked.

Similarly, if the following formula can be satisfied, the clapping/music note in that period will be considered as "clapping/playing/music note playing speed decreasing".

$$(\text{Timestamp}_{User\ Clapping/Music\ Note(N)} - \text{Timestamp}_{Record\ data(N)}) > (\text{Timestamp}_{User\ Clapping/Music\ Note(N+1)} - \text{Timestamp}_{Record\ data(N+1)}) > \ldots > (\text{Timestamp}_{User\ Clapping/Music\ Note(N+K)} - \text{Timestamp}_{Record\ data(N+K)}),$$ wherein $K$=the number of claps/music notes to be checked.

It is assumed that $\text{Clapping}_N$ is mapped to $\text{Record data}_N$, which can be any mapped pair.

Impression Analysis

The analysis will give a comment/impression about the overall performance. Here is the formula of impression analysis for clapping training:

Impression result$_{Clapping}$=$a_1$×number of missed clappings+$a_2$×number of extra clappings+$a_3$×number of shifted clappings+$a_4$×percentage of correct clapping period+$a_5$×number of clapping power errors+$a_6$×macro power errors+$a_7$×number of speed trend decreasing+$a_8$×number of speed trend increasing+$a_9$×deviation of start time from the requirement+$a_{10}$×deviation of end time from the requirement, wherein $a_x$ is the weight factor. The system will classify the impression results based on the different thresholds for clapping impression analysis.

Here is the formula of impression analysis for singing/instrument playing:

Impression result$_{Singing/Instrument\ Playing}$=$b_1$×number of missed notes+$b_2$×number of extra notes+$b_3$×number of slight frequency errors (both relative and absolute)+$b_4$×number of serious frequency errors (both relative and absolute)+$b_5$×number of slight time errors (both relative and absolute)+$b_6$×number of serious time errors (both relative and absolute)+$b_8$×speed trend increasing+$b_9$×speed trend increasing+$b_{10}$×deviation of speed from the requirement+$b_{11}$×deviation of start time from the requirement+$b_{12}$×deviation of end time from the requirement, wherein $b_x$ is the weight factors. The system will classify the impression results based on the different thresholds for singing/instrument playing impression analysis.

Display Mapped Result and Analysis to Give Feedback

On top of using speech to let the student understand his performance, the analysis results and the recommendations will be displayed through the electronic display. The system displays both the record data and student's performance on a single screen of the electronic display. According to an embodiment of the present patent application, there are two ways of presentation.

1. Overlapped Display

The record data and student's performance are displayed on the same score line and the notes of both of them are overlapped. There are special arrangements in the color of notes.

Clapping/notes of the record data will be in one type of color and the student's performance will be in another type of color in order to distinguish the two music lines while both of them are shown on the same score.

Clapping/notes of the user's performance with "strong" power will be indicated by one type of color and those with "weak" power will be indicated by another type of color.

Figure 11:
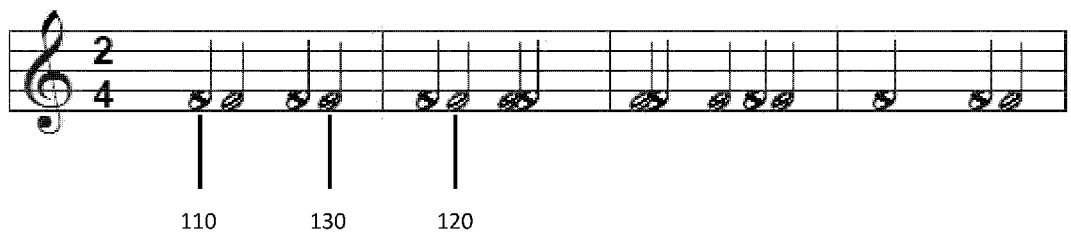
FIG. 11 is a demo screen showing the effect of using "overlapped display" to show record data and the student's performance in clapping training according to an embodiment of the present patent application.
Figure 12:
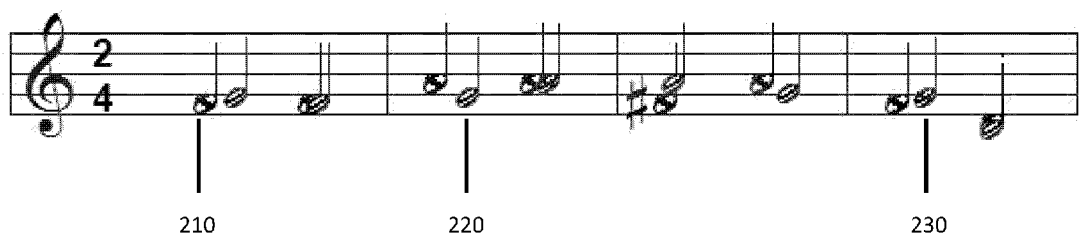
FIG. 12 is a demo screen shows the effect of using "overlapped display" to show record data and student's performance in singing/music instrument playing training according to an embodiment of the present patent application.

Note 110 (in clapping training) in FIG. 11, Note 210 (in singing/music instrument playing training) in FIG. 12 are record data in one type of color, e.g. black. (All other record data are shown with same symbol in the FIG. 11 and FIG. 12). It can be a clapping (if in clapping training, and since there is no note/frequency information of each clapping, the vertical position of the note has no meaning) or a music note (if in singing/music instrument playing training).

Note 120 (in clapping training) in FIG. 11 and Note 220 (in singing/music instrument playing training) in FIG. 12 correspond to the student's clapping/singing with "strong" power, being in another type of color, e.g. red. (All other student's claps with "strong" power are shown with same symbol in the FIG. 11 and FIG. 12). It can be a clapping (if in clapping training and since there is no note/frequency information of each clapping, the vertical position of the note has no meaning) or a music note (if in singing/music instrument playing training).

Note 130 (in clapping training) in FIG. 11 and Note 230 (in singing/music instrument playing training) in FIG. 12 correspond to the student's clapping/singing with "weak" power, being in yet another type of color, e.g. green. (All other student's clapping/singing with "weak" power are shown with the same symbol in FIG. 11 and FIG. 12). It can be a clapping (if in clapping training and since there is no note/frequency information of each clapping, the vertical position of the note has no meaning) or a music note (if in singing/music instrument playing training).

2. Dual Row Display

The record data and the student's performance can also be displayed on two score lines in parallel and the notes of both of them will be shown with the same time scale. Similarly, there are special arrangements in the color of notes as described above.

Figure 13:
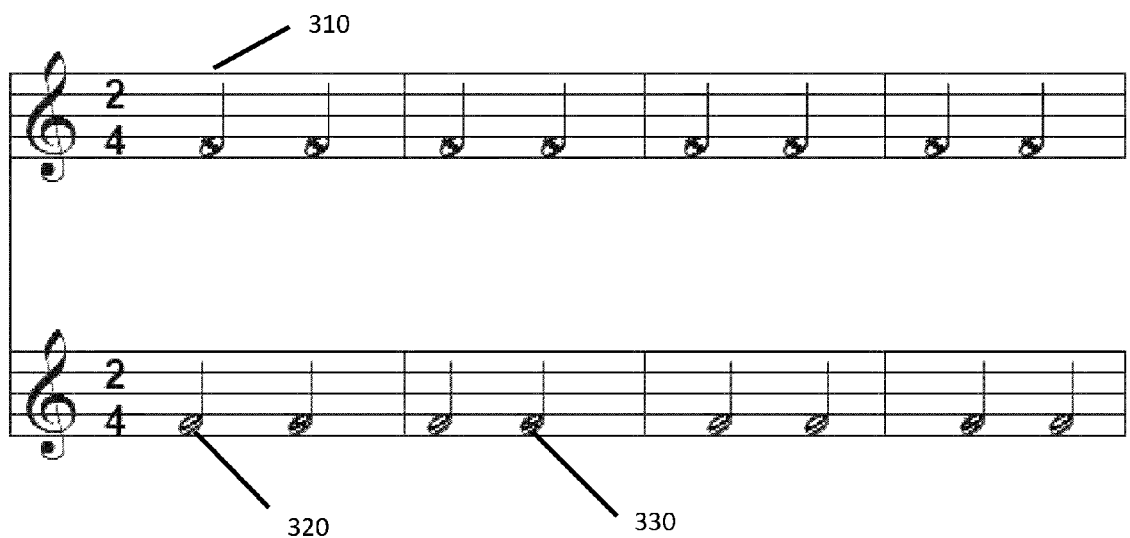
FIG. 13 is a demo screen shows the effect of using "dual row display" to show record data and student's performance in clapping training according to an embodiment of the present patent application.
Figure 14:
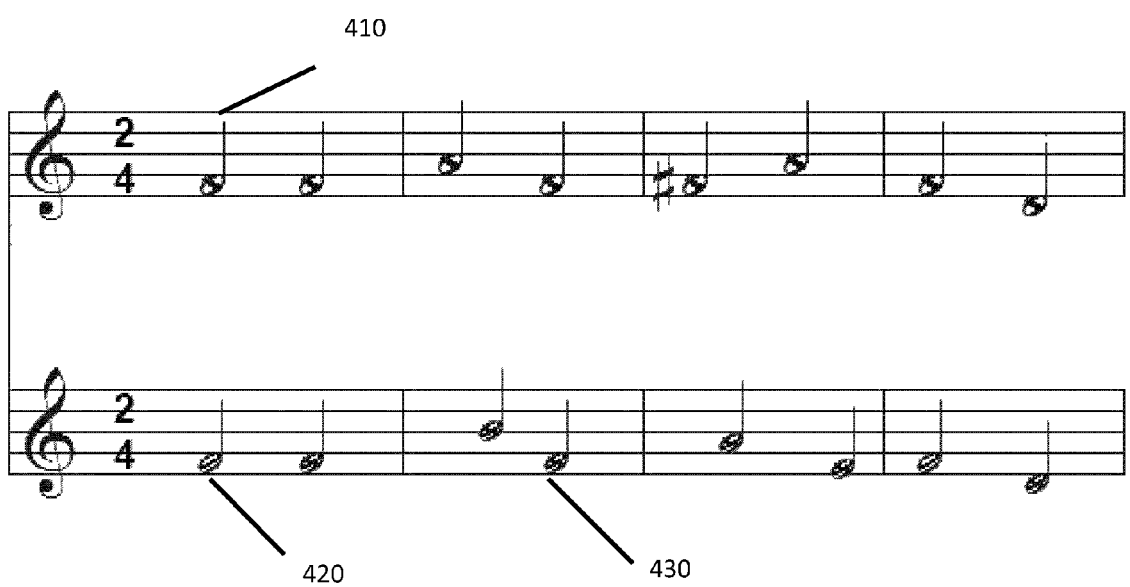
FIG. 14 is a Demo screen shows the effect of using "dual row display" to show record data and student's performance in singing/music instrument playing training according to an embodiment of the present patent application.

Note 310 (in clapping training) in FIG. 13 and FIG. 14 Note 410 (in singing/music instrument playing training) are record data in one type of color, e.g. black. (All other record data are shown with the same symbol in FIG. 13 and FIG. 14).

Note 320 (in clapping training) in FIG. 13 and Note 420 (in singing/music instrument playing training) in FIG. 14 correspond to a student's clapping/singing with "strong" power, being in another type of color, e.g. red. (All other student's clapping with "strong" power is shown with the same symbol in FIG. 13 and FIG. 14).

Note 330 (in clapping training) in FIG. 13 and Note 430 (in singing/music instrument playing training) in FIG. 14 correspond to a student's clapping/singing with "weak" power, being in another type of color, e.g. green. (All other student's clapping/singing with "weak" power is shown with same symbol in the above demo screen).

In both kinds of display methods, the system will point out the errors found during the above-mentioned analysis.

Macro Error Analysis

All results and the analysis results of individual question will be stored in a server. The server will analyze the answers and the results of all questions, and check whether there is similar trend in the errors found.

Figure 15:
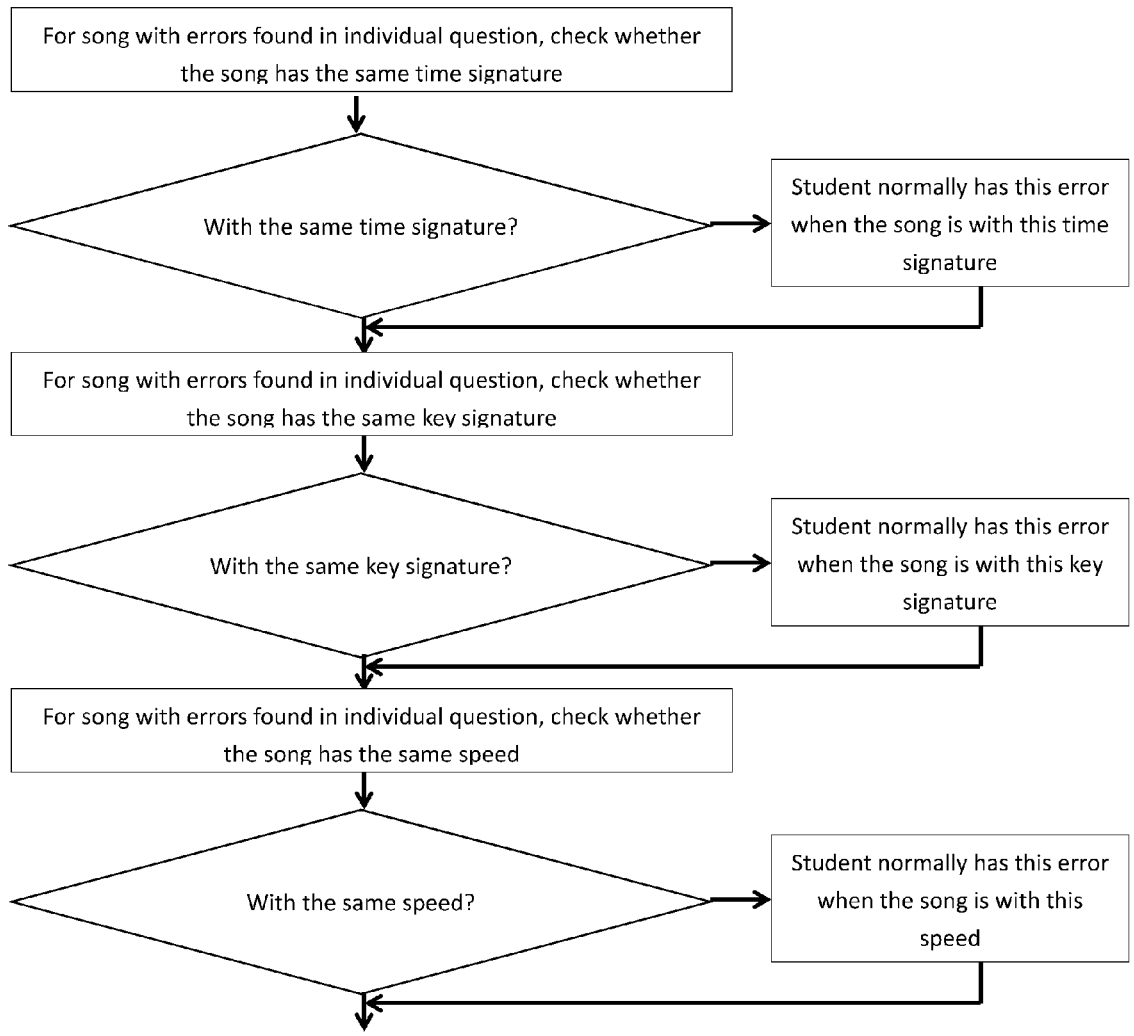
FIG. 15 is a flow chart illustrating a server checking macro errors in the method illustrated in FIG. 1.

FIG. 15 is a flow chart illustrating a server checking macro errors in the method illustrated in FIG. 1. For singing/instrument playing training, the server will also calculate the number of frequency errors of the same frequency interval in order to find out whether the student normally has his errors in singing/instrument playing in a particular frequency interval.

The above embodiments provide a method and a system that can capture the student's performance, no matter in singing, playing music instrument or clapping, analyze the performance, display students' performance and the analysis on the result in the display media, and give feedback and the analysis on the trend of the series of performance. The method and the system can be implemented in any digital platform with a processor, including but not limited to mobile phone, tablet PC, web, personal computer, digital music instrument and any other type of electronic devices.

What is claimed is:

1. A system for music education comprising:
a storage device being configured to store a set of record data that contains information about speed, timing, frequency and beats of a standard musical sample;
a recording device being configured to record a musical exercise;
a processor being connected to the storage device and the recording device, and configured to determine the start and the end of the musical exercise by the detected volume of the musical exercise, to convert the recording of the musical exercise to a set of user data, to retrieve the set of record data from the storage device and to map the set of user data to the set of record data, to analyze differences between the user data and the record data based on the mapping and thereby to calculate a series of values related to speed, timing, frequency or power of the user data, and to calculate a score as the sum of the series of values multiplied by a series of coefficients respectively; and
an electronic display being connected to the processor and configured to display the series of values, the score, or the differences between the user data and the record data to a user;
wherein the processor is configured to start recording when the detected volume of the musical exercise has been higher than a predetermined threshold for a predetermined number of times, and to end recording when the detected volume of the musical exercise has been lower than a predetermined threshold for a predetermined number of times.

2. The system of claim 1, wherein the musical exercise comprises a sequence of clapping, and the processor is configured to calculate the sum of the peak power of the clapping multiplied by a first coefficient and the total power of the clapping multiplied by a second coefficient, and thereby to detect the sequence of clapping from the set of user data and eliminate noise from the result of the detection.

3. The system of claim 2, wherein the processor is configured to calculate the duration of each clap in the adjusted user data and in the record data respectively, and to determine whether the difference therebetween is within a predetermined tolerance.

4. The system of claim 1, wherein the musical exercise comprises singing or music instrument playing, and the processor is configured to filter out any music note that is in a predetermined frequency in the user data and adjust the scale of the user data according to the scale of the record data before the mapping.

5. The system of claim 4, wherein the processor is configured to transform the record data and the user data into a matrix, calculate a cost of error for each node of the matrix, and adjust the speed and the key signature of the record data by finding a path with the lowest accumulative cost of error based on different combination of speeds and key signatures.

6. The system of claim 4, wherein the processor is configured to mark a reference point in the user data and adjust the frequencies of all the music notes in the user data based on the difference between the user data and the record data at the reference point.

7. The system of claim 6, wherein the processor is configured to calculate the frequency errors in the user data based on the mapping, to identify a speed that minimizes time errors in the user data compared to the record data, to adjust the record data according to the identified speed, and to calculate the time errors of the user data based on the adjusted record data.

8. The system of claim 1, wherein the processor is configured to identify timestamps in the user data and determine whether the start time and the end time of the user data are in accordance with the record data based on the timestamps, to calculate the power of the beats in the user data and analyze whether the power of the beats is in a correct pattern and a right timing, and to determine whether the speed of the user data has a trend of increasing or decreasing.

9. The system of claim 1, wherein the electronic display is configured to display the user data and the record data on the same score line in an overlapped fashion or on two score lines in parallel with the same time scale, to display musical elements in the record data in a first type of color, to display musical elements in the user data with a strong power in a second type of color, and to display musical elements in the user data with a weak power in a third type of color.

10. A computer-implemented method for music education, the method comprising:
storing a set of record data that contains information about speed, timing, frequency and beats of a standard musical sample on a storage device;
recording a musical exercise with a recording device while determining the start and the end of the musical exercise by the detected volume of the musical exercise with a processor;

converting the recording of the musical exercise to a set of user data with the processor;

retrieving the set of record data from the storage device and mapping the set of user data to the set of record data with the processor;

analyzing differences between the user data and the record data based on the mapping and thereby calculating a series of values related to speed, timing, frequency or power of the user data with the processor;

calculating a score as the sum of the series of values multiplied by a series of coefficients respectively with the processor; and displaying the score and the differences between the user data and the record data to a user through an electronic display;

wherein recording the musical exercise comprises starting recording by the processor when the detected volume of the musical exercise has been higher than a predetermined threshold for a predetermined number of times, and ending recording by the processor when the detected volume of the musical exercise has been lower than a predetermined threshold for a predetermined number of times.

11. The method of claim 10, wherein the musical exercise comprises a sequence of clapping, and converting the recording of the musical exercise to the set of user data comprises calculating the sum of the peak power of the clapping multiplied by a first coefficient and the total power of the clapping multiplied by a second coefficient, and thereby detecting the sequence of clapping from the set of user data and eliminating noise from the result of the detection by the processor.

12. The method of claim 11 further comprising calculating the duration of each clap in the adjusted user data and in the record data respectively, and determining whether the difference therebetween is within a predetermined tolerance by the processor.

13. The method of claim 10, wherein the musical exercise comprises singing or music instrument playing, and the method further comprising filtering out any music note that is in a predetermined frequency in the user data and adjusting the scale of the user data according to the scale of the record data before the mapping by the processor.

14. The method of claim 13 further comprising transforming the record data and the user data into a matrix, calculating a cost of error for each node of the matrix, and adjusting the speed and the key signature of the record data by finding a path with the lowest accumulative cost of error based on different combination of speeds and key signatures by the processor.

15. The method of claim 13 further comprising marking a reference point in the user data and adjusting the frequencies of all the music notes in the user data based on the difference between the user data and the record data at the reference point by the processor.

16. The method of claim 15 further comprising calculating the frequency errors in the user data based on the mapping, identifying a speed that minimizes time errors in the user data compared to the record data, adjusting the record data according to the identified speed, and calculating the time errors of the user data based on the adjusted record data.

17. The method of claim 10 further comprising identifying timestamps in the user data and determining whether the start time and the end time of the user data are in accordance with the record data based on the timestamps, calculating the power of the beats in the user data and analyzing whether the power of the beats is in a correct pattern and a right timing, and determining whether the speed of the user data has a trend of increasing or decreasing by the processor.

18. A computer-implemented method for music education, the method comprising:

storing a set of record data that contains information about speed, timing, frequency and beats of a standard musical sample on a storage device;

recording a musical exercise with a recording device;

converting the recording of the musical exercise to a set of user data with a processor;

retrieving the set of record data from the storage device and mapping the set of user data to the set of record data with the processor;

comparing the user data to the record data based on the mapping with the processor; and displaying the difference between the user data and the record data as well as a score representing a quantitative evaluation of the musical exercise based on the comparison to a user through an electronic display; wherein:

musical elements in the record data is displayed in a first type of color, musical elements in the user data with a strong power is displayed in a second type of color, and musical elements in the user data with a weak power is displayed in a third type of color;

wherein recording the musical exercise comprises starting recording by the processor when the detected volume of the musical exercise has been higher than a predetermined threshold for a predetermined number of times, and ending recording by the processor when the detected volume of the musical exercise has been lower than a predetermined threshold for a predetermined number of times.

* * * * *